(12) United States Patent
Kaji et al.

(10) Patent No.: US 11,263,232 B2
(45) Date of Patent: Mar. 1, 2022

(54) HISTORY MANAGEMENT METHOD AND HISTORY MANAGEMENT APPARATUS

(71) Applicant: DENSO CORPORATION, Kariya (JP)

(72) Inventors: Daisuke Kaji, Kariya (JP); Yohei Ooka, Kariya (JP)

(73) Assignee: DENSO CORPORATION, Kariya (JP)

( * ) Notice: Subject to any disclaimer, the term of this patent is extended or adjusted under 35 U.S.C. 154(b) by 135 days.

(21) Appl. No.: 16/512,692

(22) Filed: Jul. 16, 2019

(65) Prior Publication Data

US 2020/0026613 A1 Jan. 23, 2020

(30) Foreign Application Priority Data

Jul. 18, 2018 (JP) .............................. JP2018-135289

(51) Int. Cl.
| | |
|---|---|
| G06F 16/27 | (2019.01) |
| G06F 11/14 | (2006.01) |
| G07C 5/00 | (2006.01) |
| G07C 5/08 | (2006.01) |

(52) U.S. Cl.
CPC .......... *G06F 16/27* (2019.01); *G06F 11/1451* (2013.01); *G07C 5/008* (2013.01); *G07C 5/085* (2013.01); *G06F 2201/80* (2013.01)

(58) Field of Classification Search
CPC ...... G06F 16/27; G06F 16/273; G06F 16/275; G06F 16/278; G06F 11/1448; G06F 11/1451; G06F 2201/80; G06F 11/1456; G06F 11/1464; G06F 11/1469; G06F 2221/2101; G06F 21/64; H04L 2209/38; H04L 67/104; H04L 67/12; H04L 9/3239; H04L 9/3297; G07C 5/008; G07C 5/085; G07C 5/08; G07C 5/006

See application file for complete search history.

(56) References Cited

U.S. PATENT DOCUMENTS

| | | | |
|---|---|---|---|
| 10,713,727 B1* | 7/2020 | Floyd | G07C 5/008 |
| 10,733,160 B1* | 8/2020 | Leise | G06Q 40/00 |
| 10,880,070 B1* | 12/2020 | Delaney | H04L 9/3239 |
| 2017/0053460 A1* | 2/2017 | Hauser | G07C 5/008 |
| 2018/0018723 A1* | 1/2018 | Nagla | H04L 63/08 |
| 2018/0341930 A1* | 11/2018 | Moir | G06Q 20/3825 |
| 2018/0342036 A1* | 11/2018 | Zachary | H04L 9/0637 |

(Continued)

FOREIGN PATENT DOCUMENTS

JP 2018067108 A 4/2018

OTHER PUBLICATIONS

VINchain White Paper, Decentralized Vehicle History, Feb. 23, 2018 (Year: 2018).*

(Continued)

*Primary Examiner* — David T. Brooks
(74) *Attorney, Agent, or Firm* — Maschoff Brennan

(57) ABSTRACT

A history management method for managing history information of a vehicle using a blockchain is provided. The history management method performed by at least one processor includes generating a block for being connected to the blockchain from the history information collected in the vehicle, per block, setting a storage destination of a backup of the generated block from among nodes communicable with the vehicle, and sending the backup of the block to the node that is set as the storage destination.

11 Claims, 12 Drawing Sheets

(56) References Cited

U.S. PATENT DOCUMENTS

| | | | | |
|---|---|---|---|---|
| 2018/0374283 | A1* | 12/2018 | Pickover | G07C 5/085 |
| 2019/0007484 | A1* | 1/2019 | Chen | H04W 4/40 |
| 2019/0140919 | A1* | 5/2019 | Smith | H04L 41/5019 |
| 2019/0182313 | A1* | 6/2019 | Yoo | H04L 67/10 |
| 2019/0188086 | A1* | 6/2019 | Maeda | G06F 11/1453 |
| 2019/0208442 | A1* | 7/2019 | Amorim de Faria Cardote | G06F 16/1834 |
| 2019/0289018 | A1* | 9/2019 | Metzger | G06F 16/27 |
| 2019/0377336 | A1* | 12/2019 | Avery | H04L 67/12 |
| 2019/0378352 | A1* | 12/2019 | Dey | G07C 5/0841 |
| 2020/0019626 | A1* | 1/2020 | Todd | H04L 9/0872 |

OTHER PUBLICATIONS

Brousmiche, Kei Leo, et al. "Digitizing, securing and sharing vehicles life-cycle over a consortium blockchain: Lessons learned." 2018 9th IFIP international conference on new technologies, mobility and security (NTMS). IEEE, Feb. 2018. (Year: 2018).*

Leiding, Benjamin, Parisa Memarmoshrefi, and Dieter Hogrefe. "Self-managed and blockchain-based vehicular ad-hoc networks." Proceedings of the 2016 ACM International Joint Conference on Pervasive and Ubiquitous Computing: Adjunct. 2016. (Year: 2016).*

Singh, Madhusudan, and Shiho Kim. "Blockchain based intelligent vehicle data sharing framework." arXiv preprint arXiv: 1708.09721 (2017). (Year: 2017).*

U.S. Appl. No. 16/512,659, filed Jul. 16, 2019, filed Jul. 16, 2019, Daisuke Kaji, et al.

* cited by examiner

HISTORY MANAGEMENT METHOD AND HISTORY MANAGEMENT APPARATUS

CROSS-REFERENCE TO RELATED APPLICATIONS

This application is based on Japanese Patent Application No. 2018-135289 filed on Jul. 18, 2018, the disclosure of which is incorporated herein by reference.

TECHNICAL FIELD

The present disclosure relates to a technology of history management for managing vehicle history information.

BACKGROUND

A known transaction recording system is described in, for example, Patent Literature 1 which uses a blockchain to record histories of transactions among a large number of nodes connected to a network. In the transaction recording system of Patent Literature 1, in order to reduce the amount of data retained in a respective node, the transaction histories in a particular network are retained only by the nodes arranged in the particular network.
Patent Literature 1: JP2018-67108A The inventors of the present disclosure have studied application of the blockchain technology as in Patent Literature 1 to vehicle history information preservation. In the system of Patent Literature 1 however, all of the blocks containing transaction histories in a particular network are copied to each of all of the nodes in the particular network. Because each of the nodes has all of the blocks, an increase in amount of communications or an increase in amount of data stored in each node is unavoidable. It is therefore difficult to apply such a system as Patent Literature 1 to preservation of the vehicle history information.

SUMMARY

It is an object of the present disclosure to provide a history management method and a history management apparatus suitable for preserving vehicle history information using a blockchain technology.

A history management method in one aspect is implemented by a computer to manage history information of a vehicle using a blockchain and is performed by at least one processor, the method comprising: generating a block for being connected to the blockchain, from the history information collected in the vehicle; per block, setting a storage destination of a backup of the generated block from among nodes communicable with the vehicle; and sending the backup of the block to the node that is set as the storage destination.

A history management apparatus in one aspect manages history information of a vehicle using a blockchain and comprises: a block generation unit that generates a block for being connected to the blockchain, from the history information collected in the vehicle; a storage destination setting unit that, per block, sets a storage destination of a backup of the block generated by the block generation unit from among nodes communicable with the vehicle; and a block sending unit that sends the backup of the block to the node that is set as the storage destination by the storage destination setting unit.

In the above forms, a storage destination of a backup of a block generated from history information of a vehicle is set per block from among nodes communicable with the vehicle. Therefore, cases where all of the blocks in a blockchain are copied to all of the nodes in a particular network are avoidable. Accordingly, an increase in amount of data stored in each node or an increase in amount of communications due to each node retaining all of the blocks is suppressible. Therefore, a history management method and a history management apparatus suitable for perverting vehicle history information using a blockchain technology are realized.

BRIEF DESCRIPTION OF DRAWINGS

The above and other objects, features, and advantages will become more apparent from the following detailed description made with reference to the accompanying drawings. In the drawings.

DETAILED DESCRIPTION

Figure 1:
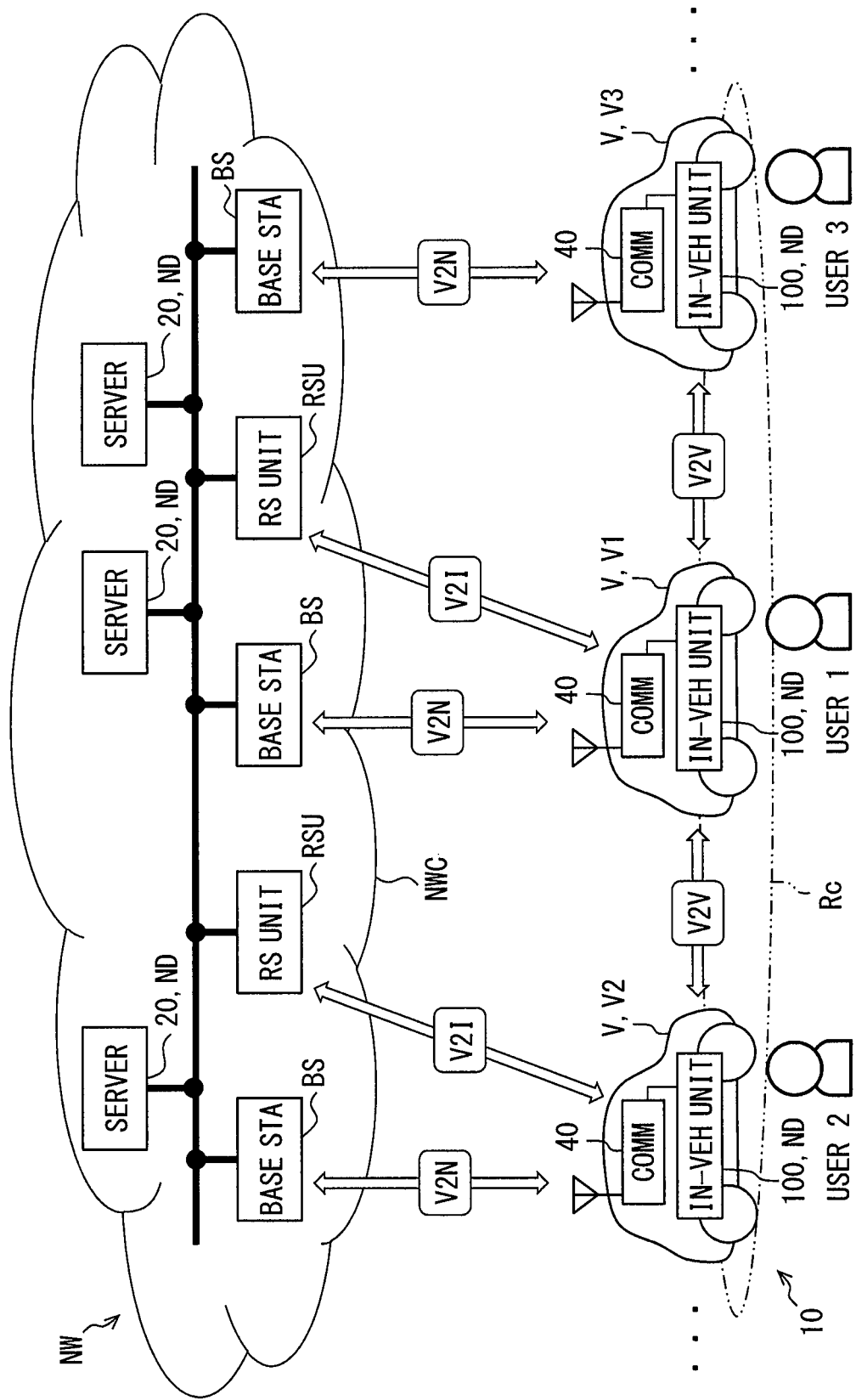
FIG. 1 is diagram illustrating an overview of a history management system including an in-vehicle unit and a network for history preservation according to one embodiment.

A history management system 10 according to an embodiment of the present disclosure illustrated in FIG. 1 includes a plurality of in-vehicle units 100 and at least one server 20 etc. The history management system 10 uses blockchains BC (see FIG. 5) to manage history information of a plurality of vehicles V each equipped with a respective in-vehicle unit 100. The in-vehicle units 100 and the server 20 are communicably connected to each other, and each function as one node ND in a network NW.

The in-vehicle unit 100 is mounted in the vehicle V together with a communication device 40. The in-vehicle unit 100 is communicable with other nodes ND via the communication device 40. The communication device 40 mainly comprises a communication module including a plurality of types of antennas for V2X communications. The V2X communications performed by the communication device 40 include V2N communications, V2I (vehicle-to-infrastructure) communications, V2V (vehicle-to-vehicle) communications, and the like. The range of the network NW for the communications by V2N communications or the V2I communications is a network cloud NWC viewed from the in-vehicle unit 100.

The communication device 40 sends and receives information to and from a base station BS by the V2N (Vehicle to cellular Network) communications in accordance with communication standards such as LTE (Long Term Evolution) and 5G. The communication device 40 transmits and receives information to and from the roadside unit RSU installed on the road by V2I (Vehicle to roadside Infrastructure) communications. By the V2V (Vehicle to Vehicle) communications, the communication device 40 directly sends and receives information to and from the communication devices 40 of other vehicles (V2, V3) existing in a specific range around the self-vehicle (V1) (hereinafter, communication range Rc).

Figure 2:
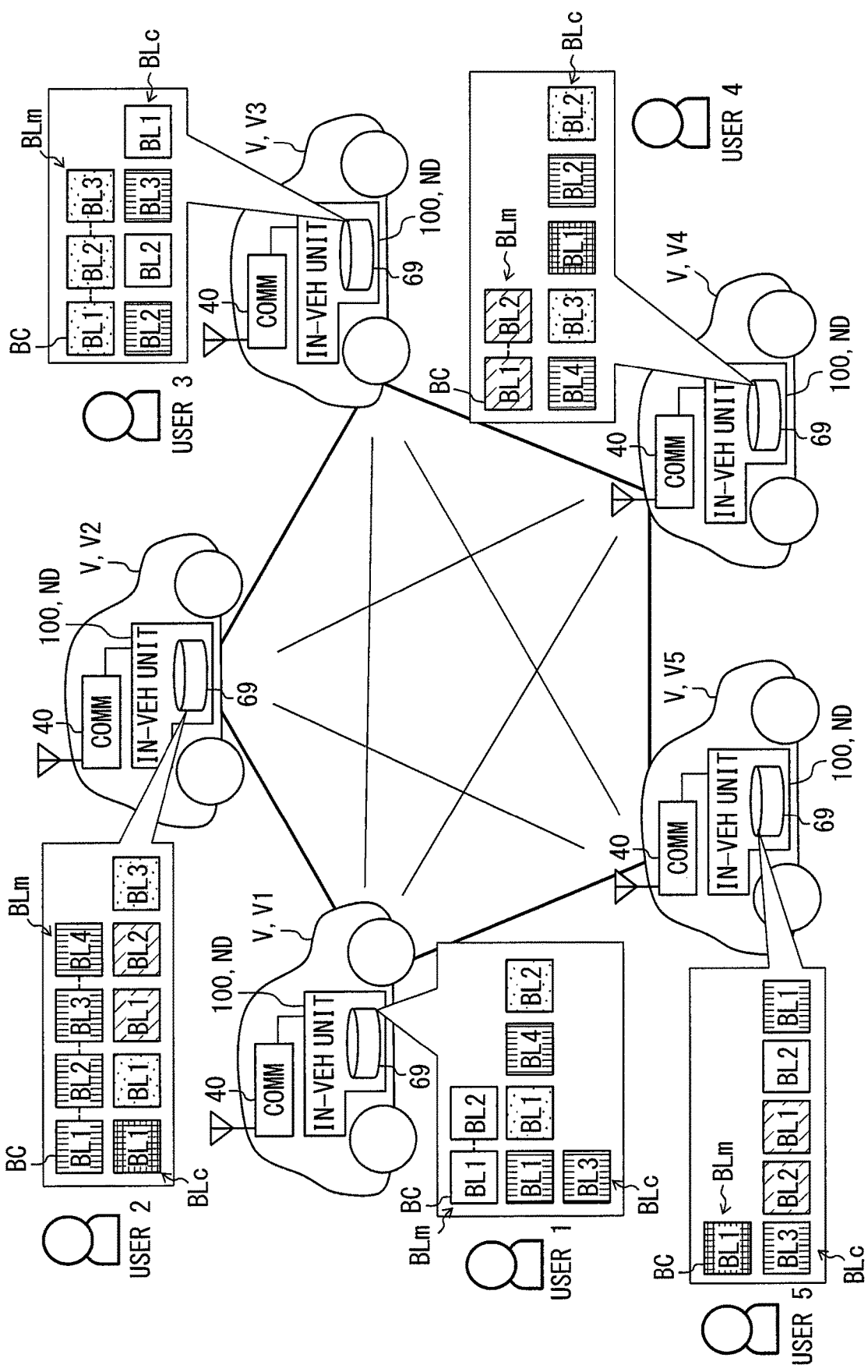
FIG. 2 is a diagram schematically illustrating a P2P network formed by a plurality of in-vehicle units.

As shown in FIG. 2, each in-vehicle unit 100 forms a P2P network capable of peer-to-peer (P2P) communications by mutual connection with another in-vehicle unit 100 via the communication device 40. Each in-vehicle unit 100 holds the history information collected in the vehicles V (V1 to V5) by P2P communications to provide a state in which the history information of respective vehicles V are distributed and stored.

Specifically, each in-vehicle unit 100 generates a blockchain BC in which the history information collected in the vehicle V equipped with this in-vehicle unit 100 is handled as transactions. The blockchain BC is generated for each vehicle V and includes a large number of blocks BL having the history information. The in-vehicle unit 100 includes a block storage unit 69 secured as a storage area for preserving the blocks BL. The in-vehicle unit 100 stores the individual blocks BL generated by itself in the block storage unit 69 of this in-vehicle unit 100, and further, in the block storage units 69 of other in-vehicle units 100. As a result, the block storage unit 69 of each vehicle V stores the blocks BL generated in a plurality of vehicles V including at least the self-vehicle.

Herein, among many blocks BL stored in the block storage unit 69, the block BL containing the history information collected in the vehicle V (self-vehicle) having this block storage unit 69 is called a master block BLm. The master blocks BLm are also called self-vehicle blocks, and form a blockchain BC by chronological order chain connection. The blocks BL other than the master blocks BLm are backup blocks BLc. The backup block BLc is an other-vehicle block and is different from the master block Blm in the history information collecting vehicle V. The backup block BLc is a copy of the master bock Blm that was generated in another vehicle V.

Figure 3:
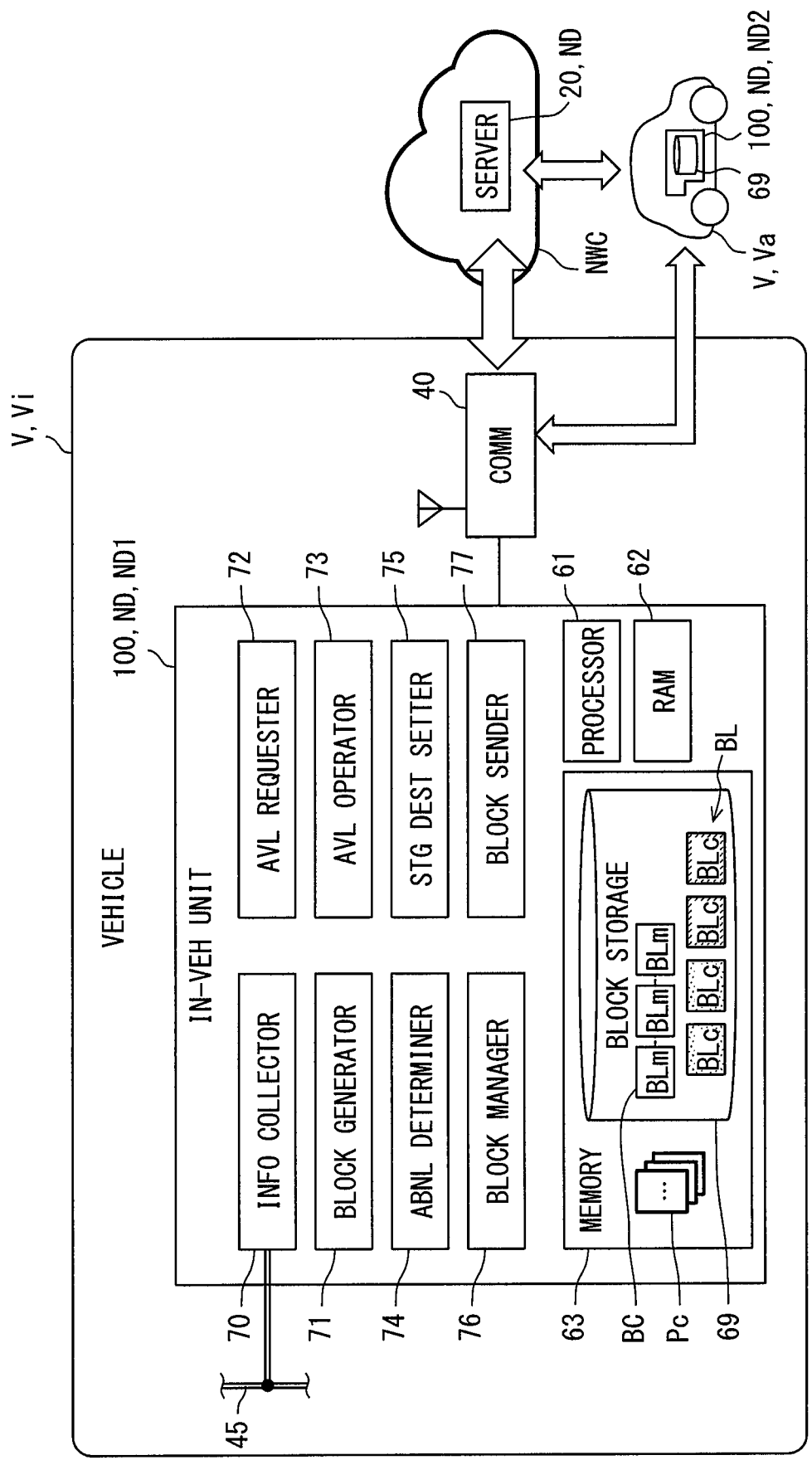
FIG. 3 is a block diagram illustrating details of functions of an in-vehicle unit.

The in-vehicle unit 100 shown in FIGS. 1 to 3 comprises an in-vehicle computer including, as its main component, a control circuit that includes a processor 61, a RAM 62, a memory device 63, and an input/output interface. The processor 61 is hardware for performing processing in conjunction with the RAM 62, and can execute various programs.

Figure 6:
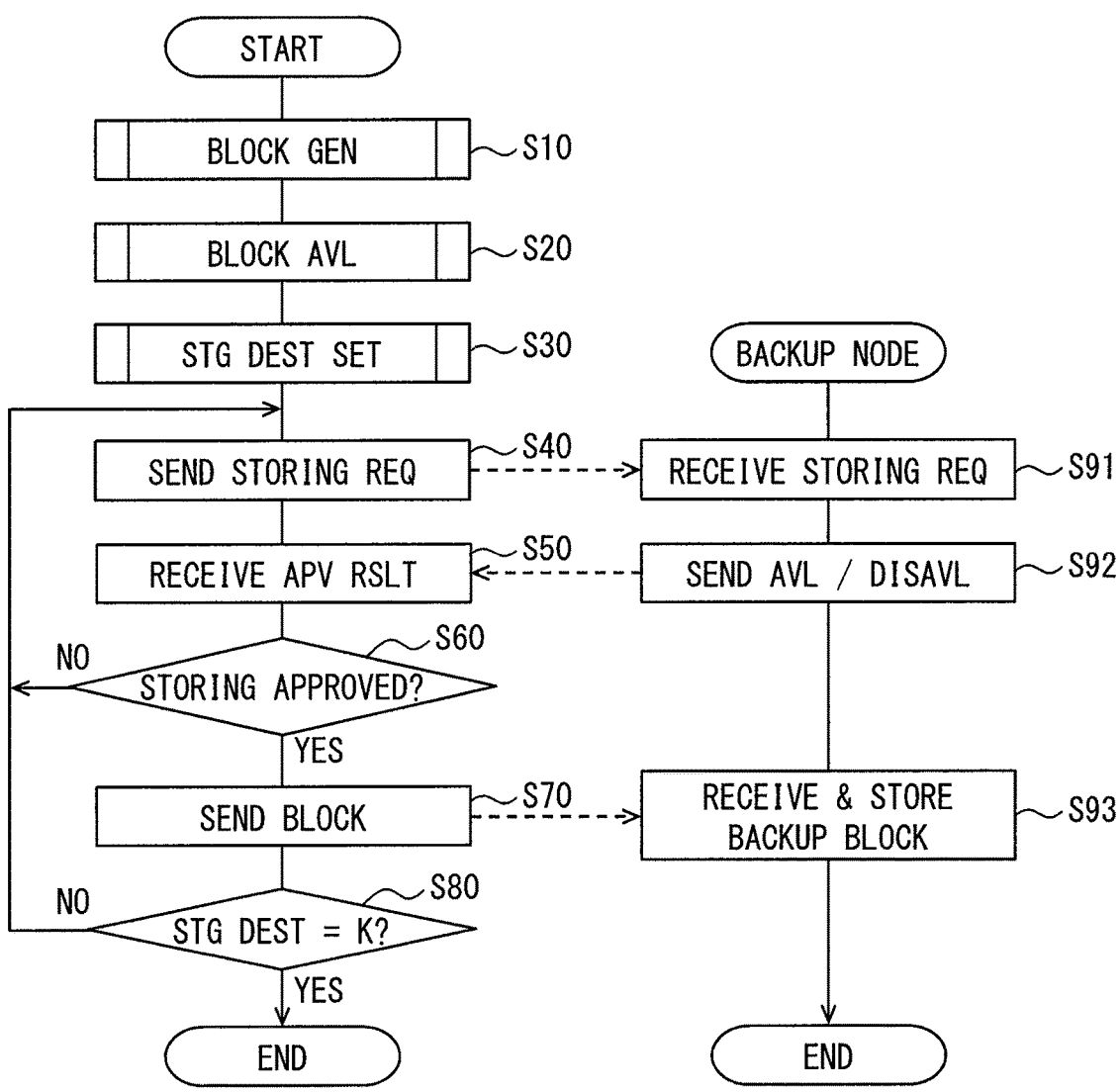
FIG. 6 is a flowchart illustrating details of a main process in a chain addition process.

The memory device 63 is configured to include a non-volatile storage medium. In the memory device 63, a storage area serving as the block storage unit 69 is secured. In addition, various programs executed by the processor 61 are stored in the memory device 63. The programs stored in the memory device 63 include at least a management program Pc for distributing and managing a large number of history information in a blockchain BC. The management program Pc causes the processor 61 to perform a chain addition process (see FIG. 6) described later. The processor 61 executing the management program Pc provides the in-vehicle unit 100 with functional units including an information collection unit 70, a block generation unit 71, an approval request unit 72, an approval calculation unit 73, an abnormality determination unit 74, a storage destination setting unit 75, a block management unit 76, and a block sending unit 77 etc.

The information collection unit 70 can collect a variety of information output to a network bus 45 of an in-vehicle LAN. In addition to acquiring the history information of the vehicle V, the information collection unit 70 acquires information that triggers the start of block generation, from the network bus 45. The history information includes a travel distance of the vehicle V at a specific time point, a record of battery charging for travel, a record of contents of parts replacement, and the like. These kinds of history information are used as transactions of each block BL (see TX1 to TX3 in FIG. 5). The trigger information includes vehicle power source switching information, information indicating start of charging, position information of the vehicle V, information indicating occurrence of parts replacement, and the like.

The block generation unit 71 generates the latest block BL (master block BLm) for being connected to the blockchain BC of the self-vehicle Vi, from the history information collected by the information collection unit 70. In the newly generated (nth) block BL, the block generation unit 71 records the history information that is not included in any of the past (up to (n−1) th) blocks BL.

The block generation unit 71 starts generating the block BL based on establishment of a plurality of start conditions. The starting conditions include a condition that a certain time has elapsed since the last generation of the block BL, a condition that the vehicle power supply and the engine (ignition) are switched to on or off, a condition that the charging is started, a condition that the vehicle moves and reaches a specific point such as a dealer, and a condition that the parts replacement is conducted.

In the master block BLm, the block generation unit 71 records node identification information IDn (see ID_NODE in FIG. 5) indicative of the node ND (in-vehicle unit 100) in which the block BL (master block BLm) was generated. The node identification information IDn also functions as vehicle identification information uniquely indicative of the vehicle V where the history information stored in the block BL was collected. In FIG. 2 and FIG. 3 and the like, the blocks BL depicted by the same hatching (including blank) are the blocks BL that have the same node identification information IDn.

In addition, when generating a new master block BLm, the block generation unit 71 records block identification information InB (see Info_BUP in FIG. 5) in the master block BLm. The block identification information InB is information that identifies the backup blocks BLc that are stored in the block storing unit 69 at the time of generating the master block BLm. The block identification information InB contains a list of node identification information elements IDn of respective backup blocks BLc and information indicating in which place of the blockchain BC the corresponding backup block BL is connected (see B/H in FIG. 5). In the list, respective node identification information is linked to the information indicating in which place of the blockchain BC a corresponding backup block BL is connected. Hereinafter, the information indicating in which place the backup block BL is connected in the blockchain BC is also referred to as a block height. In place of the block height, information indicative of anteroposterior relation of the blocks BL may be held in each block BL as information usable for blockchain restoration.

The approval request unit 72 performs the later-described block approval process (see FIG. 8), thereby requesting a plurality of other nodes ND communicable with the self-vehicle Vi to approve the newly generated block BL (master block BLm). The nodes serving as the approval request destinations (hereinafter referred to as approver nodes ND2) are mainly the in-vehicle units 100 mounted in other vehicles Va. The number N of approver nodes ND2 requested for approval by the approval request unit 72 is an odd number, and preferably three or more.

When the number of other vehicles Va existing in the communication range Rc of the V2V communications is the approver node number N or more, the approval request unit 72 requests the in-vehicle unit 100 of each of the other vehicles Va within the communication range Rc of the V2V communications to approve the block BL. On the other hand, when the number of other vehicles Va existing in the communication range Rc of the V2V communications is less than the approver node number N, the approval request unit 72 requests, via the network cloud NWC, the in-vehicle unit 100 of another vehicle Va outside the communication range Rc to approve the block BL.

The approval calculation unit 73 verifies the validity of the block BL generated at another node ND based on the approval request received from the approval request unit 72 of another in-vehicle unit 100 (another node ND). By the calculation by the approval calculation unit 73, the node ND functions as the approver node ND2. From another node ND, the approval calculation unit 73 receives information needed to perform the verification of validity, and verifies whether or not the contents of the master block BLm newly generated at the another node ND are correct. To the another node ND requesting for the approval, the approval calculation unit 73 sends an response indicative of approval or disapproval, together with a hash value uniquely indicative of the approver node ND, where the response is based on the verification result.

The abnormality determination unit 74 determines whether or not to connect the new master block BLm to the blockchain BC, based on the approval or disapproval from the approval calculation units 73 of other nodes ND. Specifically, when the responses indicative of connection affirmative are received from more than the half of the approver nodes N (2 or more out of 3 when N=3), the abnormality determination unit 74 determines to connect the new master block BLm to the blockchain BC. On the other hand, when the responses indicative of connection affirmative are received from the half of the approver nodes N or less (less than 2 out of 3 when N=3), the abnormality determination unit 74 avoids connecting the new master block BLm and determines that the data stored in the block storage unit 69 is abnormal. The determination of whether or not the connection should be made is not limited to the determination of whether the affirmative responses exceed the half. For example, a threshold value corresponding to the number N of approver nodes may be set, and the threshold is used as a basis for determining whether or not the connection should be made.

The storage destination setting unit 75 performs the later-described storage destination setting process (see FIG. 9), thereby setting, per block, storage destinations of a backup of the new master block BLm that has been permitted to connect to the blockchain BC. Unlike a typical blockchain technology, the storage destination setting unit 75 sends the backup of the block to not all of the nodes on the network but to only limited nodes, two or more, among the nodes on the network.

At the timing when the new block BL is newly generated, the storage destination setting unit 75 selects the storage destinations of the backup block BLc, which is a copy of the new master block BLm, from among other nodes ND communicable with the self-vehicle Vi. According to such setting of the storage destinations per block, the blocks BL stored in the nodes ND are different from one node to another node. The number K of backup nodes serving as the storage destinations of the backup block BLc is set to be smaller than the number N of approver nodes.

The storage destination setting unit 75 gives storage destination priority orders to communicable other nodes ND, and inquires other nodes ND in order of descending priority orders about whether the storage of the backup block is acceptable or unacceptable. The storage destination setting unit 75 selects the storage destinations for storing the backup block BLc, from among the approver nodes ND2. The storage destination setting unit 75 assigns a higher priority order to the approver node ND2 that has performed the block addition approval in a later timing. In addition, in preference to a node ND having a small remaining storage capacity of the block storing unit 69, the storage destination setting unit 75 preferentially selects another node ND having a large remaining storage capacity of the block storing unit 69 as the storage destination of the backup block BLc Further, the storage destination setting unit 75 changes a rule for selecting other nodes ND as storage destinations of the backup block BLc according to a block generation start condition. In an example, when the start condition is the switching of the vehicle power to the off state, the storage destination setting unit 75 preferentially selects, as a storage destination, the in-vehicle unit 100 of another vehicle Va that is in stopped state near the self-vehicle Vi. In another example, when the start condition is the start of charging, the storage destination setting unit 75 preferentially selects, as a storage destination, the in-vehicle unit 100 of another vehicle Va that is in a charged state near the self-vehicle Vi. In yet another example, when the start condition is the parts replacement, the storage destination setting unit 75 may preferentially select, as a storage destination, the server 20 of a dealer or the like, where the dealer performs the parts replacement.

The block management unit 76 manages the storing of the blocks BL in the block storage unit 69. When the connection of the new master block BLm is approved, the block management unit 76 stores the master block BLm in the block storage unit 69 in which the master block is stored together with the backup block BLc. In addition, when the block management unit 76 receives the backup block BLc from another node ND, the block management unit 76 stores the backup block BLc in the block storage unit 69 in which the master block BLm is also stored.

The block management unit 76 controls reception of the backup block BLc so that the storage area for the master block BLm is always secured in the block storage unit 69. The block management unit 76 sets an upper limit of the number of other vehicles Va of which the backup blocks BLc are storable in the block storage unit 69. In addition, per other vehicle Va, the block management unit 76 sets an upper limit of the number of backup blocks storable in the block storage unit 69. When the upper limit is exceeded, the block management unit 76 refuses to receive the backup block BLc from another node ND. As a result, the backup block BLc is stored in the network NW while being distributed to many in-vehicle units 100.

The block sending unit 77 controls the sending of the block BL to other nodes ND. When the newly generated master block BLm is approved, the block sending unit 77 sends the backup block BLc to the nodes ND that are set as the storage destinations by the storage destination setting unit 75. When another node ND serving as the storage destination is within the communication range Rc of V2V communication, the block sending unit 77 performs the V2V communications to send the backup block BLc to this another node ND serving as the storage destination. On the other hand, when another node ND serving as the storage destination is outside the communication range Rc, the block sending unit 77 performs the V2N communications or the V2I communications via the network cloud NWC to send the backup block BLc to this another node ND serving as the storage destination.

In addition, from the network cloud NWC, the block sending unit 77 acquires a restoration request and a provision request which are described later. The restoration request and the provision request are accompanied by the node identification information IDn (see FIG. 5) of the blocks BL that are needed in the request source. The block sending unit 77 searches the blocks BL in the block storage unit 69 for the block BL corresponding to the acquired node identification information IDn or the like, that is, for the block BL that is requested to be sent according to the restoration request and the provision request. When the requested block BL is preserved in the block storage unit 69, the block sending unit 77 sends this block BL to the requester node ND (server 20 or the like).

Figure 4:
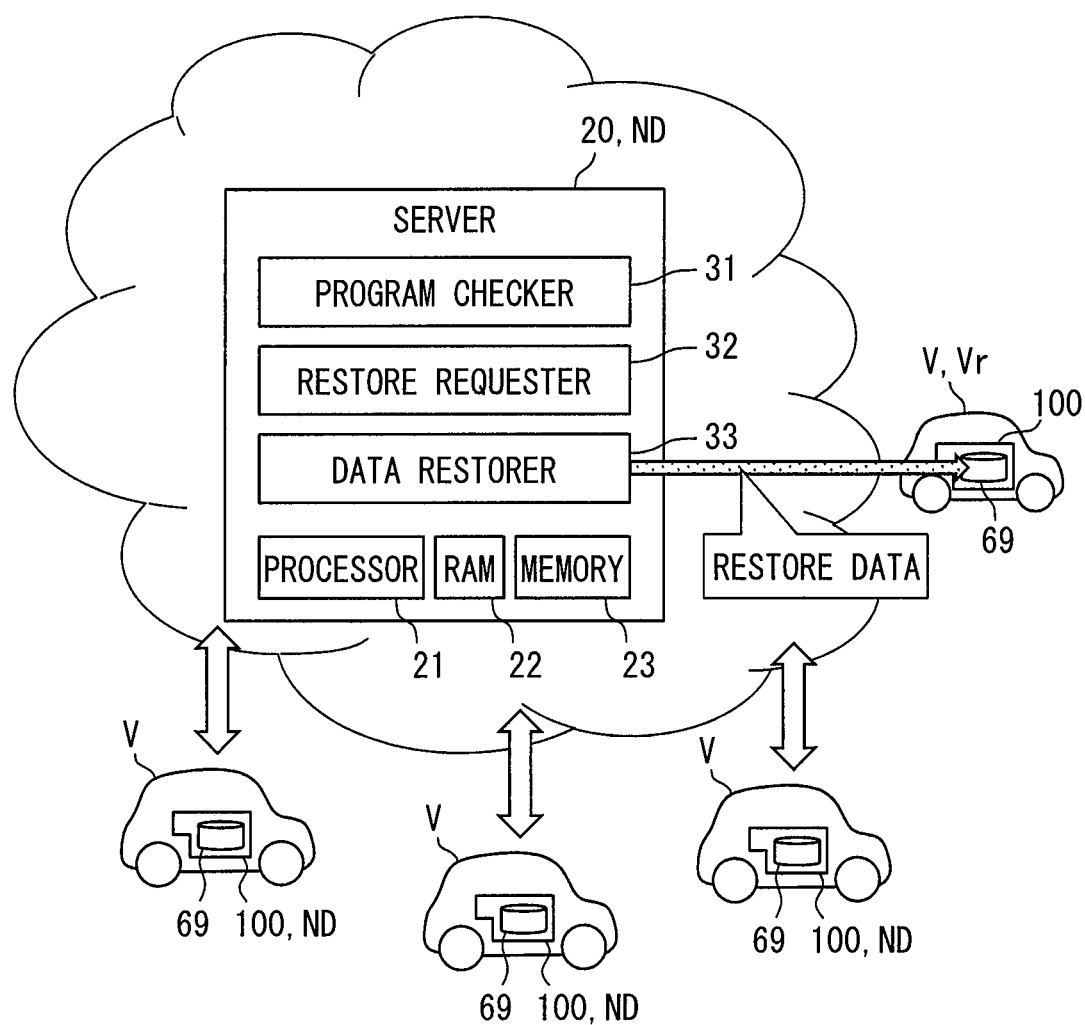
FIG. 4 is a block diagram illustrating details of functions of a server.

The server 20 shown in FIG. 4, FIG. 1, and FIG. 3 includes a computer installed in a dealer or the like, where the dealer or the like may repair the vehicles V. The processing capability of one server 20 is higher than the processing capability of one in-vehicle unit 100. The server 20 is substantially always connected to a line constituting the network NW.

Herein, in the history management system 10, the processes until the in-vehicle units 100 holds the block BL generated by a different in-vehicle unit 100 are substantially performed in the in-vehicle units 100 of the vehicles V on the edge side. Therefore, the server 20 becomes a node ND that is not substantially involved in normal processing of distributing and storing the block BL. The server 20 functions as a node ND that complements the disadvantages of the P2P communications between the in-vehicle units 100, and copes with abnormality that has occurred in the in-vehicle unit 100. The server has a function of checking the management program Pc stored in each in-vehicle unit 100 and a function of restoring a group of blocks BL determined as being abnormal.

The server 20 comprises, as its main component, a control circuit including a processor 21, a RAM 22, a memory device 23, and an input/output interface. The processor 21 is hardware for performing processing in cooperation with the RAM 22 and can execute various programs. The memory device 23 includes a nonvolatile storage medium and stores various programs executable by the processor 21. The programs stored in the memory device 23 include at least a maintenance program for performing maintenance of the history management system 10. The maintenance program causes the processor 21 to execute restoration processes (see FIG. 10 and FIG. 11) described later. The processor 21 executing the maintenance programs provides the server 20 with functional units including a program check unit 31, a restoration request unit 32, and a data restoration unit 33.

In response to an inquiry from a respective in-vehicle unit 100, the program check unit 31 checks whether or not the management program Pc of the in-vehicle unit 100 is the latest version. The program check unit 31 sends the check result to the in-vehicle unit 100 that is the inquiry source. In addition, the program check unit 31 sends the management program Pc of the latest version to the in-vehicle unit 100 that is using the old version of the management program Pc.

To nodes ND connected to the network NW, mainly to the in-vehicle units 100, the restoration request unit 32 broadcasts and distributes a request for provision of the block BL. Herein, the vehicle V in which the data stored in the block storage unit 69 is possibly abnormal is defined as a specific vehicle Vr. The specific vehicle Vr may be brought into a dealer or the like by the user. The restoration request requests that the vehicle V (in-vehicle unit 100) preserving the backup of the master block BLm of the specific vehicle Vr should send this backup block BLc. The restoration request unit 32 distributes the node identification information IDn (see FIG. 5) of the in-vehicle unit 100 mounted in the specific vehicle Vr to each node ND together with the restoration request.

After sending the restoration request, the restoration request unit 32 further broadcasts the provision request to the network NW. The provision request requests that the same blocks as the backup blocks BLc that were stored in the block storage unit 69 of the specific vehicle Vr should be sent. Together with the provision request, the restoration request unit 32 distributes data in which the block height is combined with the node identification information IDn (see FIG. 5). Due to such data distribution, the restoration request unit 32 notifies each node ND about in which node the required block was generated and in which place the required block was connected.

The data restoration unit 33 receives the backup blocks BLc, which blocks are sent from the nodes ND in response to the restoration request. The data restoration unit 33 restores the blockchain BC of the specific vehicle Vr by using the collected backup blocks BLc and connecting them as the master blocks BLm in time series based on the block height information. The data restoration unit 33 receives the blocks BL, which blocks are sent from the nodes ND in response to the provision request, and restores them as the backup blocks BLc. The blockchain BC restored by the data restoration unit 33 in this way and the restored data of each backup block BLc are copied to the block storage unit 69 of the specific vehicle Vr.

Figure 5:
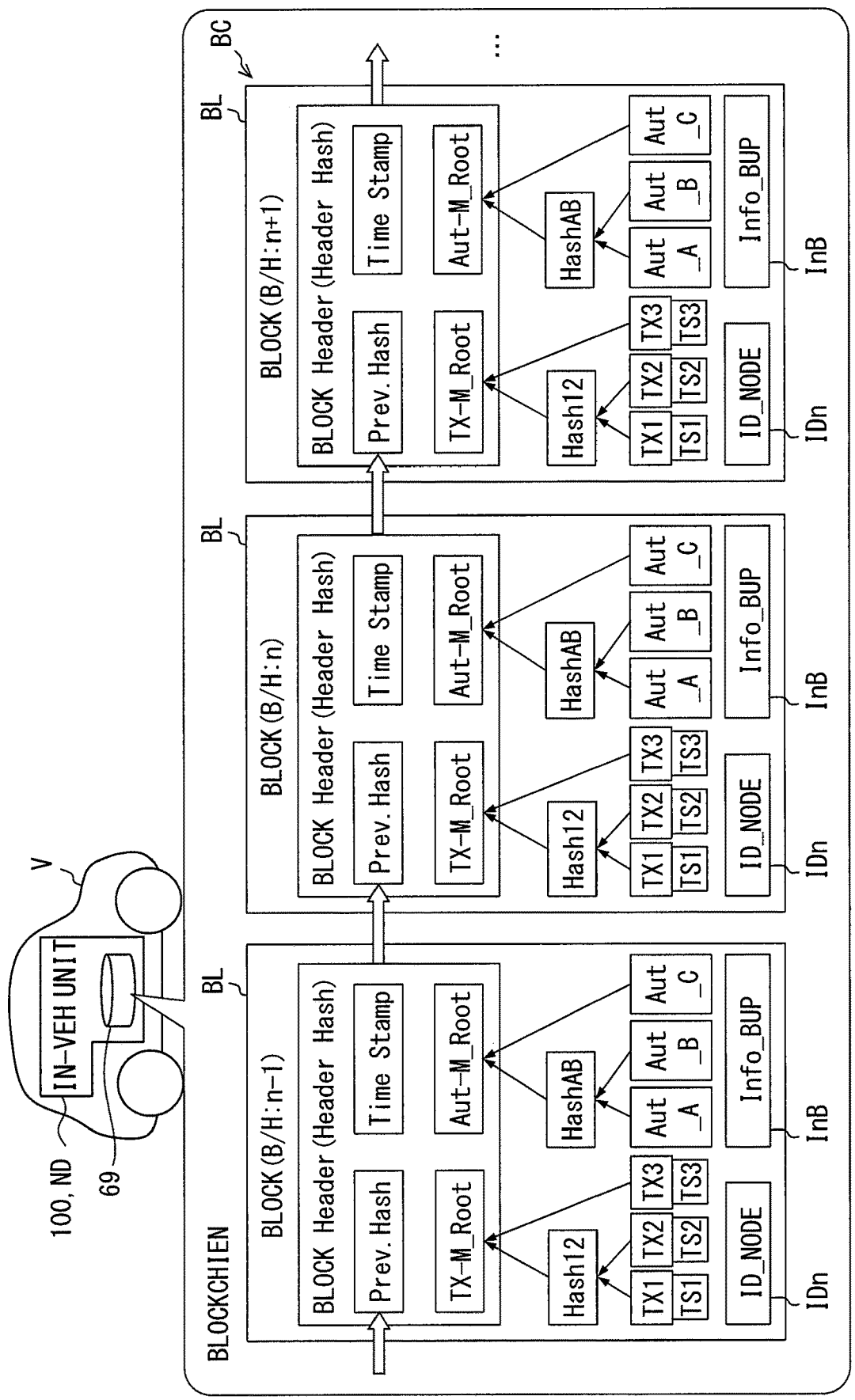
FIG. 5 is a diagram illustrating in detail contents of individual blocks forming the blockchain.

Next, details of each block BL and blockchain BC generated by a respective in-vehicle unit 100 will be further described based on FIG. 5 and referring to FIG. 3.

Each block BL has a data structure including: the history information indicative of the transactions; approver information; and a block header, in addition to the block height, the node identification information IDn, and the block identification information InB. The transactions (TX1 to TX3) are collected by the information collecting unit 70 and are included in at least one block BL. The number of transactions included in one block BL may be changed as appropriate. Each transaction is recorded in association with a time stamp (TS1 to TS3) indicating the time of occurrence of the transaction.

The approver information (Aut_A to Aut_C) is information indicative of the approver nodes ND2 (see FIG. 3) that approved this block BL. The approver information includes information received from the approver nodes ND2, which may be unique hash values indicative of the individual approver nodes ND2. In each block BL, the number of approver information corresponds to the number N of approver nodes.

The block header (BLOCK Header) includes a time stamp indicative of a block generation time, a transaction Markle route, an approver information Markle route, and a header hash value of the previous block BL. These pieces of information are recorded by the block generation unit 71.

The transaction Merkle root (TX-M_Root) is a summary of data of one or more transactions included in the block BL, and is a root hash value of the Merkle tree having ends at individual transactions. The approver's Merkle root (Aut-M_Root) is a summary of hash values acquired from a plurality of approver nodes ND2, and is the root hash value of the Merkle tree having ends at unique hash values of respective approver node ND2.

The header hash value (Prev.Hash) of the previous block BL is a value obtained by inputting the block header data of the previous block BL into a hash function. The blockchain BC has a nested structure in which the block header of each block BL is hashed and incorporated into the next block header. For this reason, when a transaction or the like of one block BL is changed, the header hash values of the subsequent blocks BL should be different values in a chain manner. Therefore, by checking the header hash value, it is possible to verify damage or falsification of a transaction or the like.

A hash function such as SHA-256 is used for the calculation of the header hash value and each Merkle route. The specifications such as the type of the hash function and the number of bits of the hash value may be changed as appropriate. For example, hash functions such as MD-5, SHA-1, SHA-512, and SHA-3 may be used to generate a hash value. Further, the hash function for calculating the header hash value and the hash function for calculating each Merkle route may be the same or different from each other.

Next, details of the chain addition process for generating a block BL from newly collected history information under the management of the management program Pc, connecting to the blockchain BC, and performing backup will be described based on FIGS. 9 to 10 and also with reference to FIG. 1, FIG. 3 and FIG. 5. The in-vehicle unit 100 starts the main process shown in FIG. 6, upon the establishment of the start condition described above.

In S10 of the main process, the block generation process (see FIG. 7) generates a block BL (master block BLm) to be newly added to the blockchain BC, from the history information collected in the vehicle V, and then the process proceeds to S20. In S20, the block approval process (see FIG. 8) requests a plurality of other nodes ND communicable with the vehicle V to approve the block BL newly generated in S10, and then the process proceeds to S30.

In S30, the storage destination setting process (see FIG. 9) sets the storage destinations of the backup of the block BL approved in S20 from among other nodes ND communicable with the vehicle V, and the process proceeds to S40. Since S30 is performed every time one block BL is newly generated, the backup storage destinations of each block BL is set per block.

In the processing on or after S40, based on the setting result of the storage destination setting processing in S30, the request to store the backup block BLc is sent to other nodes ND having high priority orders in order. Specifically, in S40, the request to store the backup block BLc is sent to another node ND (for example, the last approver nodes) having a high priority order, and the process proceeds to S50. The another node ND (backup nodes) acting as the sending destination of the storage request in S40 receive the storage request (S91) and send the approval or disapproval of the storage request (S92). When the upper limit of either the number of nodes or the number of blocks has been reached, a notification of rejection of reception is returned.

In S50, the approval or the disapproval is received from the backup node, and the process proceeds to S60. In S60, it is determined whether or not the response indicates the approval of storage. When the response indicative of rejecting the storage is received or when a time-out occurs without receipt of the response, the process returns from S60 to S40, and a storage request is sent to another node ND. On the other hand, when it is determined in S60 that the response indicative of the storage approval has been acquired, the process proceeds to S70.

In S70, the backup block BLc is sent to the backup node serving as the storage destination, and the process proceeds to S80. The backup block BLc sent in S70 is received by the backup node and stored in the block storage unit 69 of this backup node (S93).

In S80, it is determined whether or not the number of destinations of the backup block BLc has reached a predetermined number K of backup nodes. In S80, when the number of destinations is smaller than the number K of backup nodes, the process returns to S40, and a storage request is sent to another node ND. On the other hand, when it is determined in S80 that the number of destinations has reached the number K of backup nodes, the chain addition process is ended.

Next, details of the block generation process executed in S10 as a sub process, the block approval process executed in S20 as a sub process, and the storage destination setting process executed in S30 as a sub process will be described in order.

Figure 7:
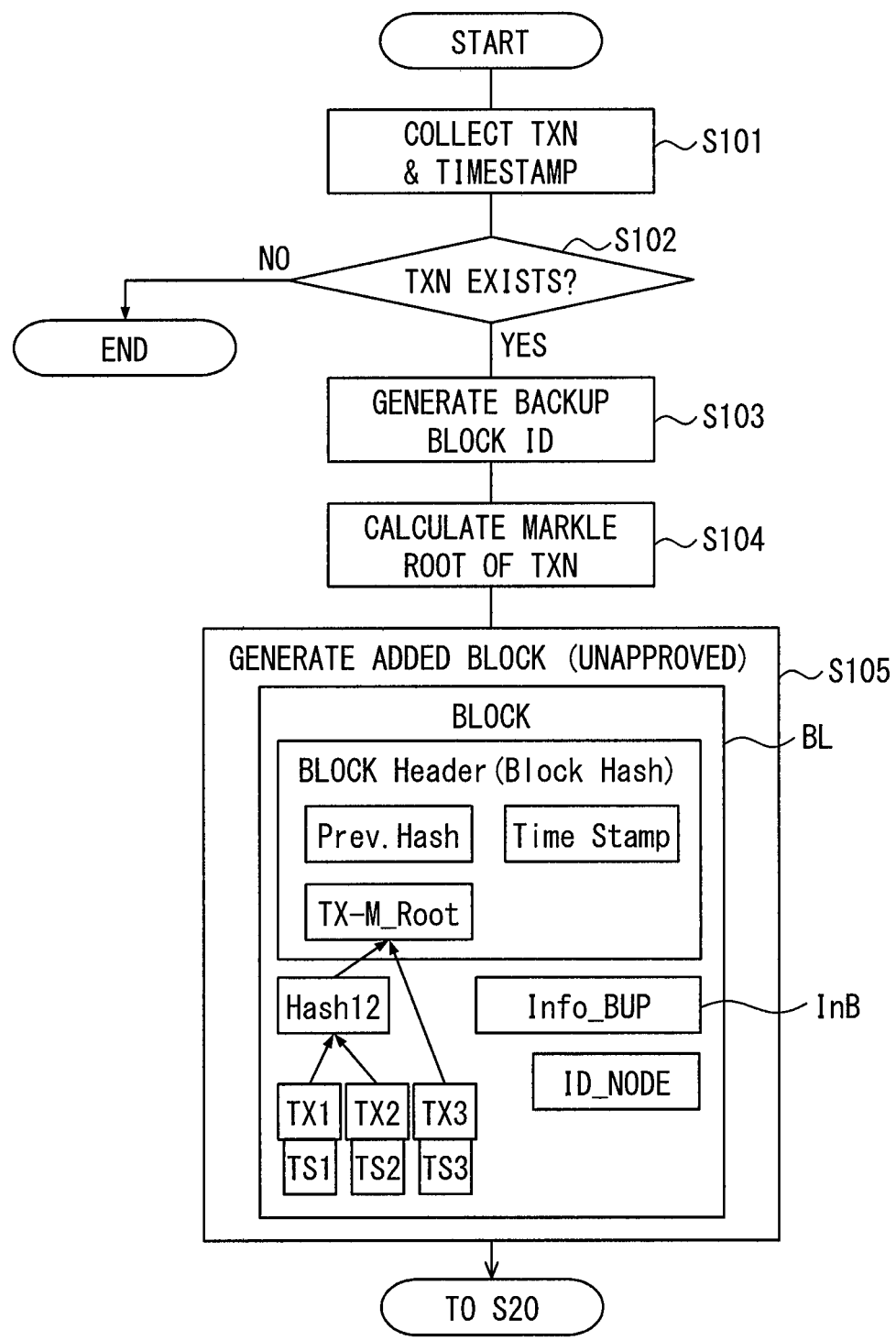
FIG. 7 is a flowchart illustrating details of a block generation process.

S101 of the block generation process shown in FIG. 7 collects the transaction (TX1 to TX3) for the history information and the time stamp (TS1 to TS3) indicative of the time of acquisition of the history information, and the process proceeds to S102. In S102, it is determined whether or not the transaction has been successfully collected in S101. When it is determined in S102 that there is no transaction, a new block BL is not generated and the chain addition process is ended. On the other hand, when it is determined in S102 that at least one transaction has been collected, the process proceeds to S103.

In S103, a list of backup blocks BLc currently stored in the block storage unit 69 is created as the block identification information InB (Info_BUP), and the process proceeds to S104. In S104, the Merkle root (TX-M_Root) of the transactions collected in S101 is calculated, and the process proceeds to S105. In S105, a block BL to be newly added is generated, and the process proceeds to S20 of the main process. In S105, for example, the node identification information IDn indicative of the vehicle V from which the history information has been collected is recorded in the block BL. However, since the block BL generated in S105 has not been approved yet, the approver information and the approver's Merkle route are absent.

Figure 8:
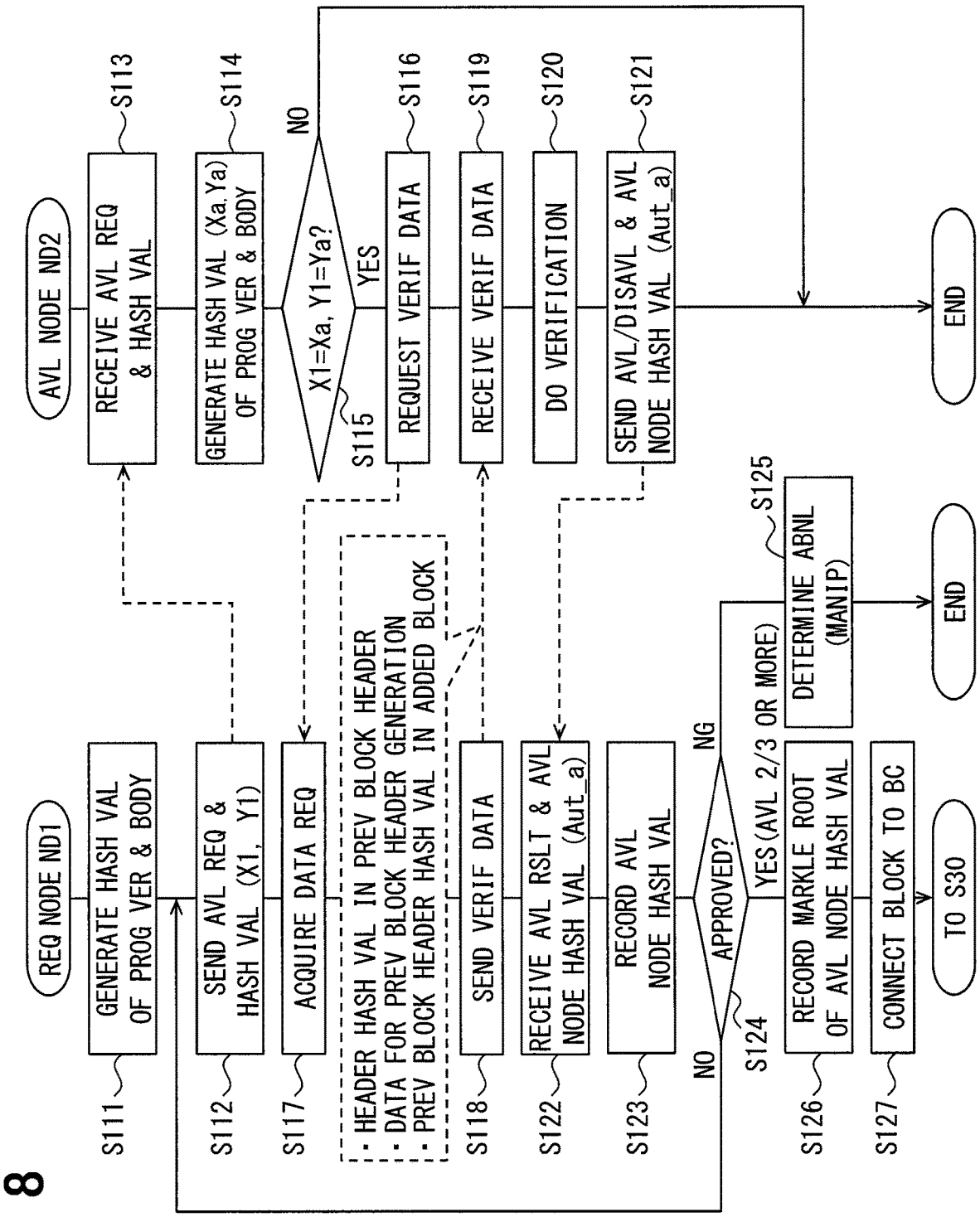
FIG. 8 is a flowchart illustrating details of a block approval process.

In the block approval process shown in FIG. 8, based on the approval request made by the approval request unit 72 of one node ND (requester node), a plurality of other nodes ND (approver nodes ND2) verify the validity of the block BL newly generated in the requester node. In the block approval process S111, the data indicative of the version of the management program Pc and the data of the main body (whole) of the management program Pc are respectively input to the hash functions to generate two hash values (X1, Y1), and the process proceeds to S112. In S112, the approver nodes, which are requested to perform the approval processes, are set, and the approval request and the hash values (X1, Y1) are sent to the approver nodes ND2.

In S113, the approver nodes ND2 receive the approval request and the hash values (X1, Y1). In S114, the management programs Pc stored in the approver nodes ND2 are read from the block storage units 69. Then, using the same hash functions as those of the requester node ND1, two hash values (Xa, Ya) are generated using the data of the management programs Pc of the nodes as inputs.

In S115, the hash values (X1, Y1) of the requester node ND1 received in S112 are compared with the hash values (Xa, Ya) of the approver node ND2 generated in S114, and it is determined whether or not these are the same. Specifically, in S115, it is determined whether or not the management programs Pc used in the requester node ND1 and the approver node ND2 are substantially the same. When it is determined in S115 that the two hash values are the same (X1=Xa, Y1=Ya), the process proceeds to S116. In S116, the requester node ND1 is requested to provide verification data for the verification of the validity of the block BL.

On the other hand, when it is determined in S115 that at least one of the hash values is different, the approver node ND2 ends the series of processes and inquires the program check unit 31 of the server 20 (see FIG. 4) about the version of the program Pc and the like. The program check unit 31 determines whether each of the management programs Pc of the requester node ND1 and the approver nodes ND2 is correct (latest). When the approver node ND2 acquires a notification that there is no problem in the management program Pc from the program check unit 31, the approver node ND2 may send a notification that there is a problem in the management program Pc of the requester node ND1 to the requester node ND1. Additionally, the hash value of each management program Pc of the program version may be generated not by each node ND on the edge side but by the server 20 on the cloud side and notified to each node ND. According to such processing, inconsistency in the program versions of the management programs Pc can be checked in advance on the server 20 side.

The request for the verification data sent in S116 is acquired by the requester node ND1 in S117. In S118, the requester node ND1 sends the verification data to the approver nodes ND2. The verification data includes the header hash value (first data) of the bock BL one before the previous block BL. included in the block header of the previous block BL, and other data (second data) needed to generate the block header of the previous block BL. The verification data further includes a header hash value obtained by hashing the block header of the previous block BL included in the block BL to be added.

The verification data sent in S118 is acquired by the approver nodes ND2 in S119. Then, the approver nodes ND2 perform the verification operation in S120. Specifically, in the verification operation, based on the management program Pc of the approver node ND, the header hash value of the previous block BL is calculated from the first data and the second data acquired in S119. Then, it is determined whether or not the header hash value calculated at the requester node ND1 received in S119 matches the header hash value calculated at the approver node ND2. If these two hash values match, the approver node ND2 approves the addition of the new block BL. On the other hand, when the two hash values are different, the approver node ND2 does not approve the addition of the new block BL.

As described above, in the block approval process, the header hash value included in the new master block BLm is calculated in at least one approver node ND2 which is different from the requester node ND1 which generated the master block BLm. Then, on the conditions that the block BL is generated using the correct (latest) management program Pc and that the header hash value thus obtained is correct, the validity of the newly generated block BL is confirmed.

In S121, the verification result in S120 is sent to the requester node ND1. When the addition of the block BL is approved in S120, a notification that the addition is approved and a unique hash value of the approver node ND2 are sent to the requester node ND1. On the other hand, when the addition of the block BL is not approved in S120, a notification that the addition is not approved is sent to the requester node ND1.

The approval or the disapproval sent in S121 is acquired by the requester node ND1 in S122. When the notification of approval is acquired, the hash value of the approver node ND2 is recorded as the approver information in the block BL in S123, and the process proceeds to S124. In S124, it is determined whether or not the affirmative notifications of approval have been obtained from more than two-thirds (a majority) of the approver node number N. When it is determined in S124 that the affirmative notifications of approval are less than two-thirds of the approver node number N, the process returns to S112, and an approval request or the like is sent to another approver node ND2.

On the other hand, when the notification that the header hash value calculated by the approver node ND2 is different from the header hash value generated by the requester node ND1 has been acquired, the process proceeds to S125. In S125, it is determined that there is an abnormality such as falsification in the preserved data of the requester node ND1, and the chain addition process is ended. The result of the abnormality determination is notified to the user through a display device or the like mounted in the vehicle V.

On the other hand, when the affirmative notifications of approval are obtained from two-thirds or more of the approver node number N in S124, it is determined that the approval is completed, and the process proceeds to S126. In S126, the Merkle route of the hash value serving as the approver information is calculated, the Merkle route is recorded in the block BL, and the process proceeds to S127. In S127, the new block BL is connected to the blockchain BC, and the process proceeds to S30 of the main process.

Figure 9:
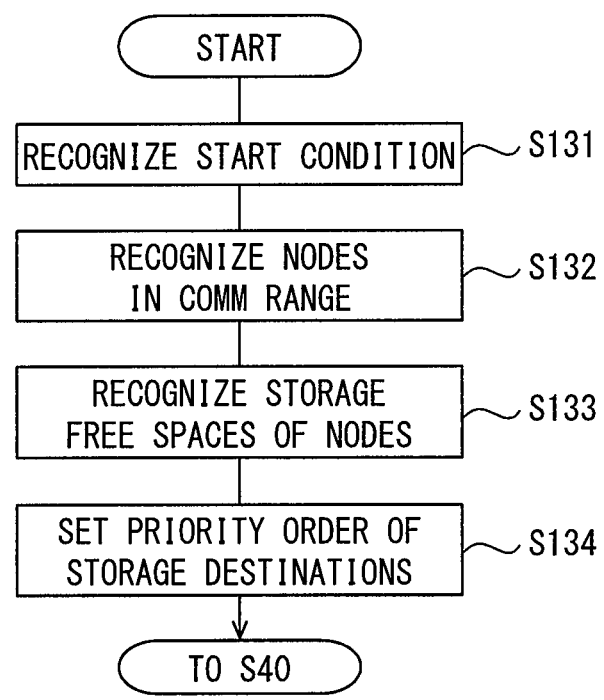
FIG. 9 is a flowchart illustrating details of a storage destination setting process.

In S131 of the block approval process shown in FIG. 9, the start condition of the chain addition process is recognized, and the process proceeds to S132. In S132, the other nodes ND (other vehicles Va) within the communication range Rc of the self-vehicle Vi are recognized, and the process proceeds to S133. In S133, the remaining storage capacities of the block storage units 69 of the communicable other nodes ND are recognized, and the process proceeds to S134. In S134, based on the information recognized in S131 to S133, the nodes serving as the storage destinations of the backup block BLc are selected from among the other nodes ND, the storage destination priority orders are set, and the process proceeds to S40 of the main process.

Next, details of a series of restoration processing for restoring the preserved data of the block storage unit 69 based on the abnormality determination in S125 will be described based on FIG. 10 and FIG. 11 and with reference to FIG. 12 and FIG. 5. As described above, the preserved data is restored by the server 20 of the dealer into which the specific vehicle Vr is brought. The server 20 performs the chain restoration process for restoring the blockchain BC and the backup restoration process for restoring the backup blocks BLc in order. In the case of FIG. 12, the vehicle V1 of the user 1 is the specific vehicle Vr. Further, the vehicle V2 of the user 2 is not connected to the network NW.

Figure 10:
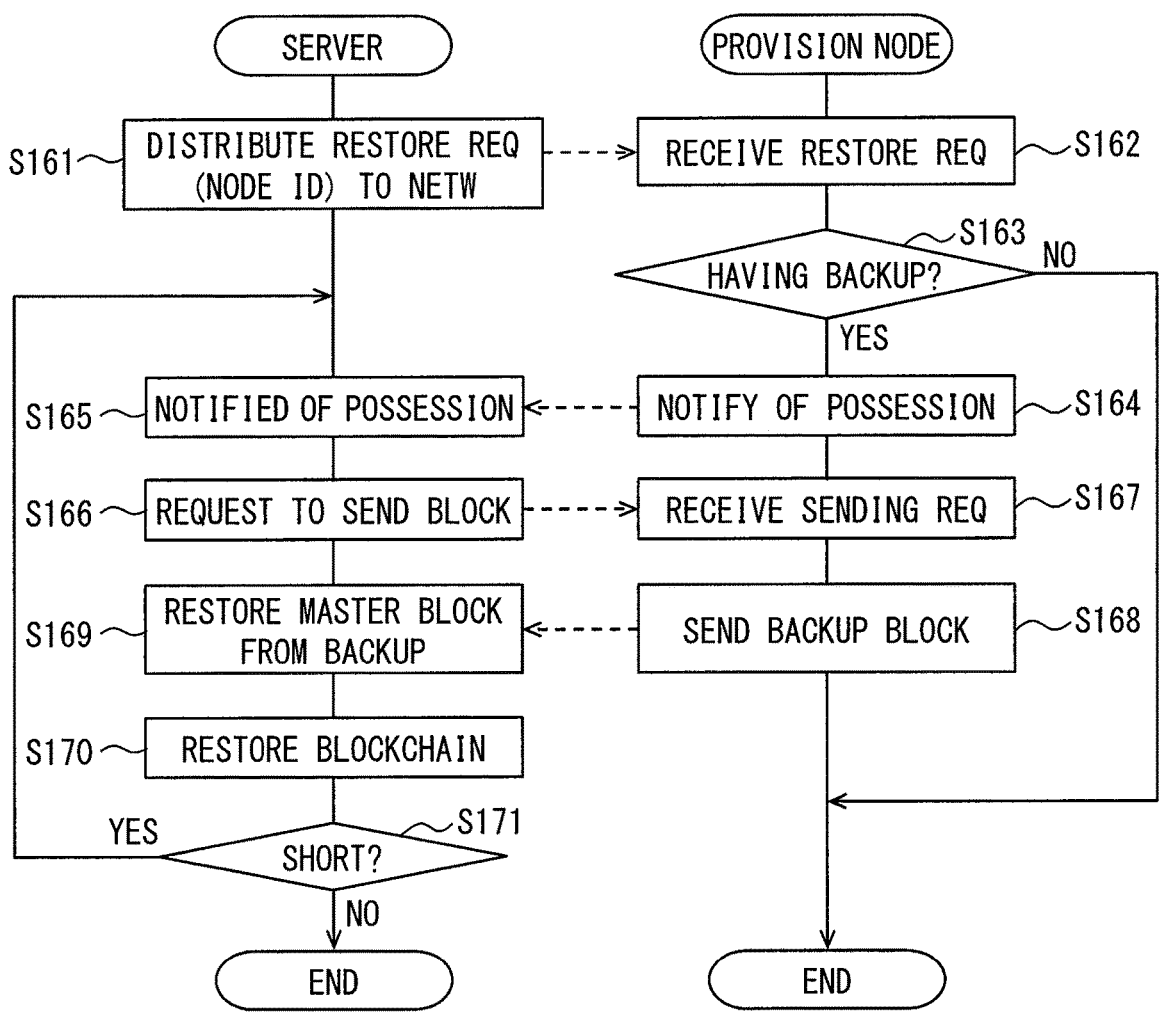
FIG. 10 is a flowchart illustrating details of a chain restoration process.

In S161 of the chain restoration process shown in FIG. 10, the simultaneous distribution of the restoration request to the network NW together with the node identification information IDn of the specific vehicle Vr to the network NW is performed. The restoration request of S161 is received by other nodes ND in S162. In S163, respective other nodes ND having received the restoration request act as the provider nodes and collates whether or not the backup block BLc matching the node identification information IDn exists in the storage unit 69 thereof. For example, the provider node that does not have the corresponding backup block BLc, such as the vehicle 4 of the user 4, ends the process.

The provider node that has determined that there is the corresponding backup block BLc, such as the vehicle V3 of the user 3, performs S164. In S164, a notification indicative of the possession of the backup block BLc (BL1, BL2) is sent to the server 20 which is the source of the request. The possession notification sent in S164 is received by the server 20 in S165. In S166, the server 20 sends a sending request for the backup block BLc to the provider node.

When the sending request sent in S166 is received by the provider node in S167, the provider node starts sending the requested backup block BLc in S168. The sent backup block BLc is a block BL (BL1, BL2) in which the node identification information IDn of the specific vehicle Vr is recorded. The backup block BLc sent in this way is received by the server 20 in S169. The server 20 restores the master blocks BLm from the received backup blocks BLc, and the process proceeds to S170. In S170, the collected master blocks BLm are connected in time series based on the block height, the time stamp, or the information indicative of the anteroposterior relationship between the blocks BC, and thereby the blockchain BC is restored, and the process proceeds to S171.

In S171, it is determined whether there is shortage of the master blocks BLm. When it is determined in S171 that there is a missing master block BLm, the process returns to S165 to receive the missing block BL from another provider node. On the other hand, when it is determined in S171 that all of the master blocks BLm have been successfully collected and that the blockchain BC has been successfully restored, the chain restoration process is ended.

Figure 11:
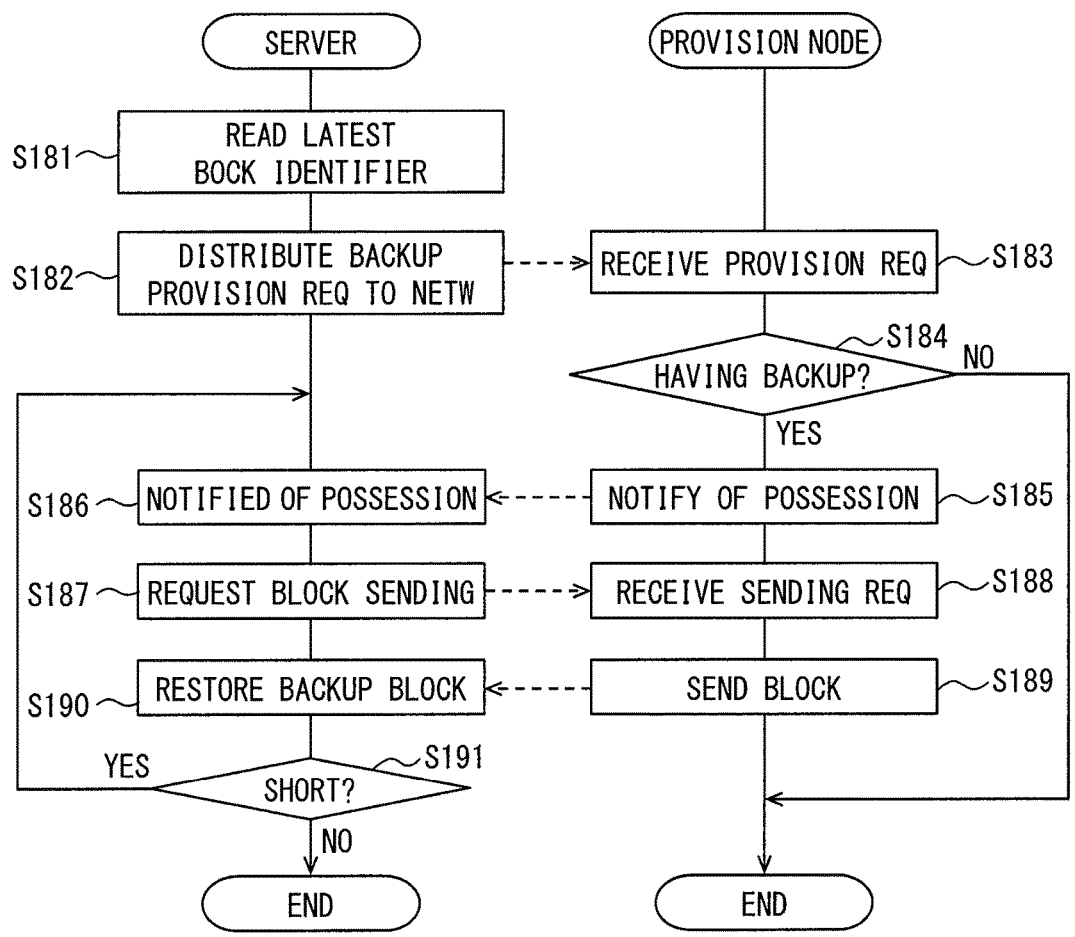
FIG. 11 is a flowchart showing details of the backup restoration processing.
Figure 12:
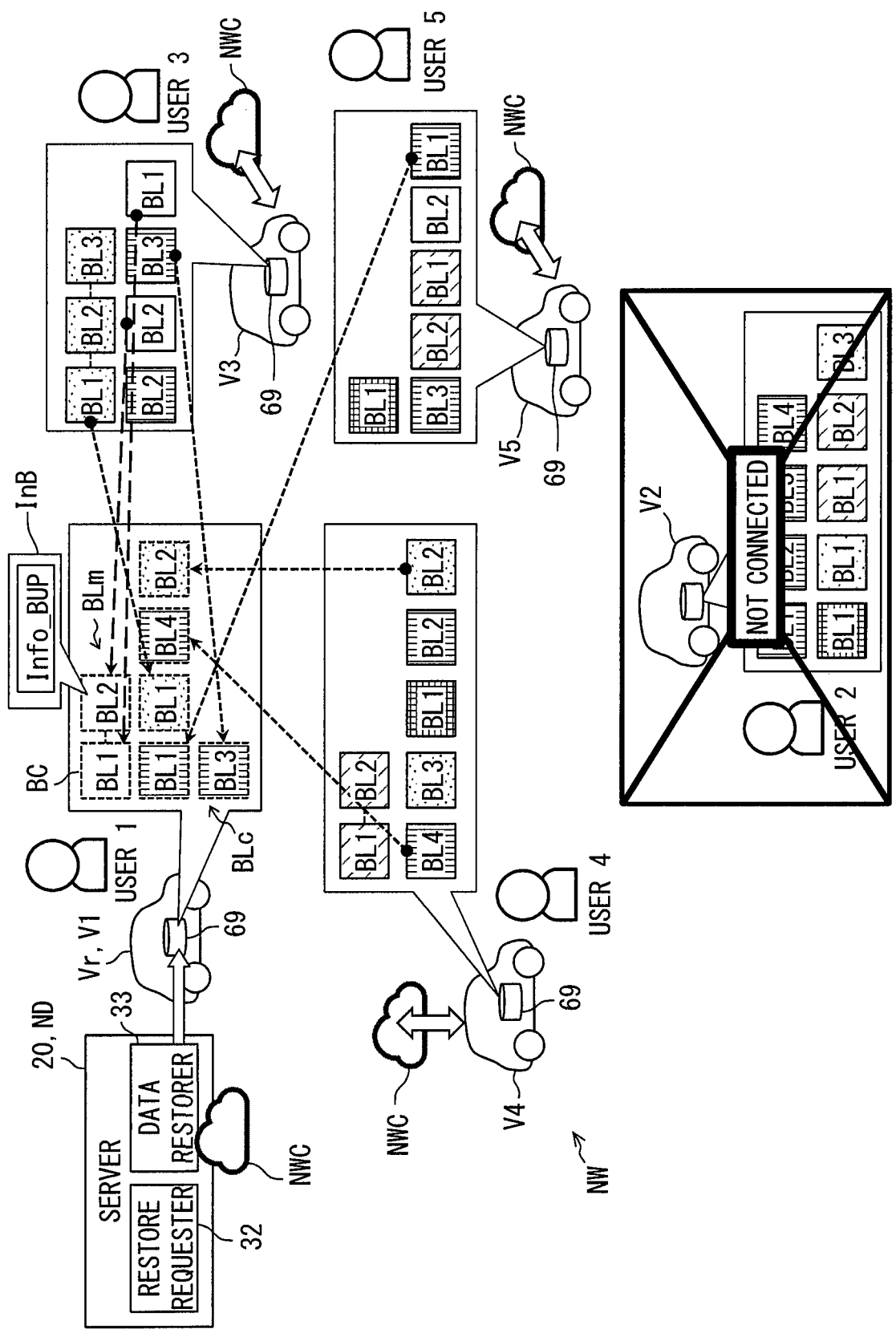
FIG. 12 is a diagram for explaining how a blockchain and a backup block are restored.

In S181 of the backup restoration process shown in FIG. 11, the server reads the block identification information InB from the blockchain BC restored by the chain restoration process, and the process proceeds to S182. The block identification information InB is read from the last block BL (BL2). In S182, the provision request for the same block BL as the backup block BLc recorded in the block identification information InB is broadcasted to the network NW Each block BL targeted for the provision request is identified by a combination of the node identification information IDn and the block height.

The restoration request in S182 is received by each provider node in S183. The provider node having received the provision request checks whether or not the corresponding block BL is preserved in the block storage unit 69 thereof in S184. When it is determined in S184 that there is the block BL, the process proceeds to S185.

In S185, a notification indicative of the possession of the requested block BL is sent to the server 20 which is a source of the request. The possession notification sent in S185 is received by the server 20 in S186. In S187, the server 20 sends a sending request for the block BL to the provider node.

When the sending request sent in S187 is received by the provider node in S188, the provider node starts sending the requested block BL in S189. The block BL sent in S189 is received by the server 20 in S190. Then, the server 20 restores the backup blocks BLc from the received blocks BL, and the process proceeds to S191.

In S191, a determination as to shortage of the restored backup blocks BLc is made by referring to the block identification information InB acquired in S181. When it is determined in S191 that there is the shortage of the backup blocks BLc, the process returns to S186 to further acquire a block BL from another provider node. For example, even if the two blocks BL4 and BL2 are received from the vehicle V4 of the user 4, there is shortage of backup blocks BLc. In this case, two blocks BL1 and BL3 are further received from the vehicle V3 of the user 3. Furthermore, one block BL1 is received from the vehicle V5 of the user 5. This processing is continued and then when it is determined in S191 that all the backup blocks BLc have been restored, the backup restoration processing is ended.

In the present embodiment described above, when the block BL is generated, the backup destinations of the generated block BL are set per block from among other nodes ND communicable with the self-vehicle Vi. Therefore, it is possible to avoid the situation where all of the blocks BL forming the blockchain BC are stored in every node ND. In other words, the block BL generated by one in-vehicle unit 100 is copied not to the nodes ND but to only some two or more of the nodes. Accordingly an increase in the amount of communications due to copying of the block BL and an increase in the amount of stored data in each node ND are suppressible. Therefore, it is possible to realize the history management suitable for preserving the history information of the vehicle V using the blockchain BC technology.

In addition, in the present embodiment, a plurality of approver nodes ND2 are requested to approve the newly generated block BL. The number K of backup nodes serving as backup storage destinations is set smaller than the number N of approver nodes serving as block BL approval request destinations. This setting reduces the number K of backup nodes and makes it possible to further suppress the increase in communications amount and the increase in stored data amount.

Additionally, in the present embodiment, the number N of approver nodes is an odd number, and preferably an odd number of 3 or more. With this setting, it is possible to determine whether or not the newly generated block BL should be connected, based on the majority decision of the approver nodes ND2. Accordingly, it is possible to simplify a determination logic as to whether or not to add the new block BL.

Additionally, in the present embodiment, at least one of the backup nodes is selected from a plurality of approver nodes ND2 having calculated the header hash values. In many cases, it is assumable that the communicable state between the approver node ND2, which is requested to perform the calculation of the header hash value, and the self-ode ND is maintained even at the timing of sending the backup. Therefore, the selecting of the backup node from among the approver nodes ND2 makes it possible to realize smooth transition from the approving of the backup block to the sending of the backup block BLc.

Additionally, the higher priority for being selected as the backup node is assigned to the approver node D2 that has approved the block addition in a later timing. With this configuration, the self-node ND can promptly select the communicable-state-keeping approver node ND2 as the backup node, and can execute the sending of the backup block BLc. In view of the above, it is preferable that the approver node ND2 that has performed the approval operation last is set as the first backup node.

Additionally, in the present embodiment, the node having a larger remaining storage capacity of the block storage unit 69 than the node having a smaller remaining storage capacity of the block storage unit 69 is preferentially set as the backup node from among a plurality of other nodes ND communicable with the self-node ND. When the backup block BLc is preferentially sent to the node ND having a large remaining storage capacity of the block storage unit 69 in this way, the concentration of the backup blocks BLc on one node ND is avoidable. As a result, the backup blocks BLc are highly likely to be distributed and stored in many nodes ND in the network NW, so that even if the generation of backup is restricted, it is possible to prevent loss of a collection of data.

Additionally, in the present embodiment, the rule for selecting the backup nodes is changed according to the start condition for starting the generation of the new block BL. With this control, the self-node ND can preferentially set another node ND that can easily maintain the communicable state as the backup node, in accordance with the situation where the self-vehicle Vi is placed at the timing of starting the block generation. Accordingly, it is possible to stably perform the sending of the backup block BLc even in the history management system in which the in-vehicle units 100 mounted in the vehicles V function as the nodes ND.

Additionally, in the present embodiment, the in-vehicle unit 100 that generates the master block BLm from the history information of the self-vehicle Vi functions as a node ND that preserves the backup blocks BLc of the history information of other vehicles Va. Therefore, the necessity of installing a dedicated server or a dedicated vehicle-mounted device for preserving the backup blocks BLc can be reduced.

In the present embodiment, the upper limit is set for the number of other vehicles Va of which the backup blocks BLc are storable in one block storage unit 69. With this setting, even if both the master block BLm and the backup block BLc are storable in the block storage unit 69 of the in-vehicle unit 100, it is possible to secure a storage area for storing the master block BLm. Additionally, since concentration of backups on one in-vehicle unit 100 is avoidable, it is possible to prevent the loss of the collection of data.

Furthermore, in the present embodiment, an upper limit of the number of backup blocks BLc storable in the block storage unit 69 is set per other vehicle Va (other node ND). With this configuration, the backup blocks BLc of one vehicle V are not preserved in one in-vehicle unit 100 in a centralized manner, but are highly likely distributed and stored in many in-vehicle units 100. Accordingly, in case of an occurrence of an abnormality in the preserved data of one in-vehicle unit 100, it is possible to avoid a situation in which most of the backups of other in-vehicle units 100 are lost at once.

Additionally, in the present embodiment, another node ND existing in the communication range Rc of the V2V communications is preferentially selected as the backup node. Then, when there is the backup node in the communication range Rc, the backup block BLc is sent by the V2V communications. When the V2V communications are actively used in this way, an increase in traffic on the network cloud NWC side due to the backuping is suppressible.

When there is no other node ND in the communication range Rc of the V2V communications, the storage destination setting unit 75 uses communications other than the V2V communication to send the backup block BLd to the backup node BLc outside the communication range of V2V communications. Therefore, even when the block BL is generated in a situation where there is no other vehicle Va around, the in-vehicle unit 100 can perform the sending of the backup to the backup node.

Additionally, in the present embodiment, when the master block BLm is generated, the block identification information InB enabling the identification of the backup blocks BLc stored in the block storage unit 69 is recorded in the master block BLm. Therefore, once the blockchain BC of the specific vehicle Vr having abnormality in the stored data is successfully restored using the blocks BL sent from the provider nodes, the backup blocks BLc of other vehicles Va that were backed up in the block storage unit 69 becomes identifiable.

Accordingly, it becomes possible to bring back the block storage unit 69 of the specific vehicle Vr to a state where not only the master blocks BLm of the self-vehicle Vi but also the backup blocks BLc of other vehicles Va are restored. Therefore, a situation where the backup blocks BLc are completely lost and the blocks BL necessary for restoring the blockchain BC are no longer collectable is avoidable. Therefore, the restoration of the blockchain BC is performable even in the system where the blocks BL including the history information are backed up in a limited manner.

In the present embodiment, furthermore, in the master block BLm, the node identification information IDn is recorded as the vehicle identification information which indicates the vehicle V that collected the history information. Therefore, when each node ND storing the backup block BLc acquires the node identification information IDn of the specific vehicle Vr together with the restoration request, the node ND can correctly determine whether the backup block BLc for the specific vehicle Vr are stored in the block storage unit 69 of this node.

According to the above, even if the storage destinations of the backup block BLc are set per block, the backup blocks BLc needed to restore the blockchain BC of the specific vehicle Vr are appropriately collectable from other nodes ND that were set as the storage destinations. Therefore, the blockchain BC can be restored even when the blocks BL including the history information are limitedly backed up.

In addition, in the present embodiment, after restoring the blockchain BC from the backup blocks BLc sent based on the restoration request, the block identification information InB recorded in the latest block BL of the restored blockchain BC is read. Then, the provision of the backup block BLc recorded in the read block identification information InB is requested. According to the above, the server 20 can request each provider node to send the block BL after accurately recognizing the backup blocks BLc that were preserved in the block storage unit 69 immediately before the occurrence of the data abnormality.

In the present embodiment, the addition of the new block BL is approved based on the verification calculation of the header hash value by the approver node ND2. As described above, when the header hash value of the immediately preceding block header is confirmed at the timing of adding the new block BL, it is possible to appropriately detect an abnormality in the transaction data or the management program Pc. Therefore, it is possible to generate the blockchain BC by repeating the chain connection of the verified blocks BL.

Furthermore, in the present embodiment, identity between the management programs Pc held by the requester node ND1 and the approver node ND2 is checked before the step of calculating the header hash value for confirming the validity of the newly generated block BL at the approver node ND2 is performed. Therefore, when the calculated header hash values are different from each other, the in-vehicle unit 100 can estimate with high accuracy whether there is an abnormality in data such as a transaction rather than an abnormality in the management program Pc.

In the above embodiment, the master block BLm corresponds to a self-vehicle block, the backup block BLc corresponds to an other-vehicle block, and the communication range Rc corresponds to a specific range. Further, the number K of backup nodes corresponds to the number of nodes serving as backup storage destinations, and the number N of approver nodes corresponds to the number of nodes serving as block approval request destinations. Further, the server 20 corresponds to a computer, and the in-vehicle unit 100 corresponds to a history management device and a computer.

OTHER EMBODIMENTS

Although one embodiment of the present disclosure has been described above, the present disclosure is not construed as being limited to the above-described embodiment, and is applicable to various embodiments and combinations without departing from the spirit and scope of the present disclosure.

In the above embodiment, the total number of nodes in one network for storing backups in a distributed manner may be changed as appropriate. For example, in-vehicle units that comply with a specific standard may be allowed to participate in the network without a substantial upper limit. In this case, each in-vehicle unit can have a backup block regardless of vehicle manufacturers.

Certain restrictions on nodes participating in one network may be set. For example, a single network that distributes and stores backups may be formed only by in-vehicle units mounted in vehicles of a specific manufacturer. Furthermore, in-vehicle units registered in a specific area or a specific period of time may form one network.

As long as the number of backup nodes K and the number of approved nodes N are smaller than the total number of nodes included in one network, these may be set within a range that does not significantly increase the traffic on the cloud side. In addition, the backup node number K may be set to the same value as the approver node number N or may be set larger than the approver node number N. Further, the approver node number N may be an even number.

The rule for selecting backup nodes can be changed as appropriate. For example, the storage destination setting unit may select the backup node based on the GNSS signal or the like so as to geographically disperse the vehicles for storing the backup. The storage destination setting unit may preferentially select a node other than the approver node as the backup node. The storage destination setting unit may preferentially select another node that was selected as the backup node in the past as the current backup node, or may exclude it from the candidates of the current backup node. The storage destination setting unit may not change the priority order assignment rule based on the start condition, and may not set the priority orders based on the remaining storage capacity and the like.

In the above embodiment, the block storage unit for storing the backup blocks has both the upper limit of the number of other nodes and the upper limit of the number of blocks per node. Specific values of these upper limits may be changed as appropriate according to, for example, the storage capacity of the block storage unit. In addition, these upper limits may not be set.

Specifications such as contents and data sizes of individual blocks constituting the blockchain may be changed as appropriate. For example, the history information recorded as the transactions in the block is not limited to the information illustrated in the above embodiment. Together with a respective transaction, the time stamp indicative of the acquisition time of the respective transaction may be hashed and incorporated in the transaction Merkle route.

The block identification information, the node identification information, and the like may be incorporated in the block header. In the above embodiment, the node identification information also functions as vehicle identification information. However, the node identification information and vehicle identification information may be described as separate information items in each block.

The block generation unit of the above embodiment collects the node identification information and the block height of each of the preserved backup blocks and records them in the newly specified master blocks as the block identification information. The contents of such block identification information may be changed as appropriate as long as preservation information of the backup blocks is restorable. For example, in place of the block height, the time stamp described in the block header may be left as the block identification information.

In the above embodiment, the blockchain preserving the history information of one vehicle is generated by a respective corresponding in-vehicle unit. That is, the blockchains of the in-vehicle units stand independently of one another. However, through sending header hash values between the in-vehicle units, data connection of blocks generated by a plurality of in-vehicle units may be made by the hash values. According to the above, the history information of the plurality of vehicles collected in one network is collected in one blockchain. This makes it more difficult to perform tampering or the like.

As described above, in the form in which one blockchain is generated for one entire network, the node identification information and the vehicle identification information may not be recorded in the block. In such a form, the block height or the time stamp functions as information for identifying the blocks to be collected from the provider nodes when the block storage unit restores the data.

In the present embodiment described above, the restoration of the backup blocks is started after the restoration of the blockchain is completed. However, the restoration of the backup blocks may be performed in parallel with the restoration of the blockchain. For example, when the block identification information read from the latest one of the collected master blocks is used, at least a part of the backup blocks to be collected is recognizable before the completion of blockchain restoration.

In the above embodiment, both the master blocks and the backup blocks are stored in the block storages unit of the memory device provided in the in-vehicle unit. However, the storage area for storing the backup blocks may be physically separated from the storage area for storing the master blocks.

Further, a block storage unit may be provided in the memory device of the server. In addition, there may be a node in the network that do not store the backup blocks, or there may be a node that is provided mainly for the purpose of storing the backup blocks. Furthermore, a complete P2P network in which no server is provided in the network may be formed substantially only by the in-vehicle units.

In the above-described embodiment, a newly generated block is approved by the process of sequentially checking the identity of the management program and the header hash value between the requester node and the approver node. However, a specific processing method for approving a newly generated block may be changed as appropriate. For example, in place of each in-vehicle unit, a specific server under management of an administrator may be assigned as an authority for approving a newly generated block.

The vehicle of which the history information is preserved by the history management method of the present disclosure may be a private vehicle which is privately owned by a user, or may be a business vehicle such as a bus and a freight vehicle. Alternatively, the history management method according to the present disclosure may be used to preserve the history information of unmanned driving vehicles providing mobility services. When a history management system for managing the history information of vehicles for mobility service is constructed, the server may be installed, for example, in a management center that manages the operation of each vehicle.

In the above embodiment, a plurality of in-vehicle units are communicable with each other by LTE or 5G communications, vehicle-to-vehicle communications, or the like. However, the communications method between the nodes may be changed as appropriate. For example, all of the data including the approval request and the backups may be sent and received only by the V2N communications without using the vehicle-to-vehicle communications. Alternatively, the sending and receiving of all of the data including the approval request and the backups may be completed only by the vehicle-to-vehicle communications.

In a situation where the communications by a communication device is unfeasible, the sending of the approval request, the backups and the like is temporarily interrupted. The sending of the approval request, the backup and the like may be performed after returning to a communicable state. In addition, the block generation unit may be configured so as not to start a new block generation under an environment where the communications are unstable.

In the above embodiment, the server and the in-vehicle unit are described as examples of computers that implement the history management method of the present disclosure. However, the computer that implements the history management method is not limited to these, and may be changed as appropriate. In addition, the server on the network cloud and the in-vehicle unit may perform distributed processing related to the blockchain generation.

In addition, the function of generating the blockchain may be incorporated, for example, not in a dedicated in-vehicle unit but in an in-vehicle unit for automated driving or an in-vehicle unit for HMI control. Furthermore, the processes relating to the blockchain generation may be distributed to a plurality of in-vehicle units. Further, the processes of restoring the blockchain and the backup blocks may be executed not by the server as described above but by the in-vehicle unit or the like on the edge side.

As described above, the functions provided by the control circuits of the in-vehicle unit and the server in the above embodiment may be provided as software and hardware for executing the software, software only, hardware only, or a composite combination thereof. Furthermore, when the functions are provided by electronic hardware circuits, a respective function may also be provided by a digital circuit including a large number of logic circuits, or an analog circuit.

In addition, the data processing related to the management program, the maintenance program and the like, and the specific configuration of the processor for executing the instructions and codes can be changed as appropriate. The processor may include a GPU (Graphics Processing Unit) in addition to a CPU (Central Processing Unit). The processor may include an FPGA (Field-Programmable Gate Array), or an accelerator specialized for AI learning and inference (for example, a DSP (Digital Signal Processor)). The processor may be configured and implemented on an application specific integrated circuit (ASIC), an FPGA, or the like.

A respective memory device having a configuration for storing each program and the like may be various non-transitory tangible storage media such as a flash memory and a hard disk. Forms of these storage medium may also be changed as appropriate. For example, the storage medium may be in the form of a memory card or the like, and may be configured to be inserted into a slot portion and electrically connected to the control circuit. Furthermore, the storage medium is not limited to the above-described memory devices of in-vehicle devices, servers or the like, and may be an optical disk for providing a copy of the program to the memory device, a hard disk drive of a general-purpose computer, or the like.

Explanation on reference numerals will be added. Reference numeral denotes the history management system. Reference numeral 20 denotes the server (computer). Reference numeral 21 denotes the processor. Reference numeral 32 denotes the restoration request unit (request distribution unit). Reference numeral 61 denotes the processor. Reference numeral 69 denotes the block storage unit. Reference numeral 71 denotes the block generation unit. Reference numeral 75 denotes the storage destination setting unit. Reference numeral 77 denotes the block sending unit. Reference numeral 100 denotes the in-vehicle unit (history management device, computer). BC indicates the blockchain. BL indicates the block. BLm indicates the master block (self-vehicle block). BLc indicates the backup block (other-vehicle block). IDn indicates the node identification information (vehicle identification information). InB indicates the block identification information. ND indicates the node. ND1 indicates the requester node (first node). ND2 indicates the approver node (second node). K indicates the number of backup nodes. N indicates the number of approved nodes. NW indicates the network. NWC indicates the network cloud. Pc represents the management program (calculation program). Rc indicates the communication range (specific range). V indicates the vehicle. Va represents another vehicle. Vi indicates the self-vehicle. Vr indicates the specific vehicle.

What is claimed is:

1. A history management method implemented by a computer to manage history information of a self-vehicle using a blockchain, for the self-vehicle, the blockchain being defined as a plurality of blocks each generated from the history information collected in the self-vehicle and connected in a chain in a chronological order such that a hash value generated based on previous block is included in next block, the method performed by at least one processor and comprising:

generating a connection target block which is the block that, upon approved, is permitted to be connected to the blockchain, from the history information collected in the self-vehicle;

upon the connection target block being permitted to be connected to the blockchain, per the connection target block having been permitted to be connected to the blockchain, setting two or more storage destinations of a backup of the connection target block having been permitted to be connected to the blockchain, from among backup destination options including a different vehicle other than the self-vehicle, the backup of the connection target block comprising a copy of the connection target block that is sent to the two or more storage destinations;

connecting the connection target block to the blockchain; and sending the backup of the connection target block having been permitted to be connected to the blockchain to the storage destinations, wherein the two or more storage destination are part of the backup destination options, and wherein setting the two of more storage destinations and sending the backup of the connection target block include:

determining whether the different vehicle exists in a range of vehicle-to-vehicle communications by the self-vehicle; and based on determining whether the different vehicle exists in the range of vehicle-to-vehicle communications by the self-vehicle, (i) setting the two or more storage destinations to include the different vehicle and sending the backup of the connection target block to the different vehicle by the vehicle-to-vehicle communications, or (ii) setting the two or more storage destination to two or more of the storage destination options outside the range of the vehicle-to-vehicle communications and sending the backup of the connection target block to the two or more storage destinations via communication cloud based on determining whether the different vehicle exists in a range of vehicle-to-vehicle communications by the self-vehicle.

2. The history management method according to claim 1, further comprising:

requesting the two or more storage destination options to serve as approval request destinations, wherein the approval request destinations are storage destination options that are requested to approve a block that has not been approved, whereas the storage destinations are the storage destination options that store a block that has been approved and permitted to connect to the blockchain, and wherein the number of storage destination options serving as the storage destinations of the backup is smaller than the number of storage destination options serving as approval request destinations of the block.

3. The history management method according to claim 2, wherein the number of storage destination options serving as the approval request destinations of the block is an odd number.

4. The history management method according to claim 2, wherein at least one of the storage destinations of the backup is selected from the storage destination options requested to approve the block.

5. The history management method according to claim 1, wherein of the two or more storage destinations, the storage destination having a large remaining amount of storage capacity reserved for preserving the blocks is selected as the storage destination of the backup in preference to the storage destination having a small remaining amount of storage capacity reserved for preserving the blocks.

6. The history management method according to claim 1, wherein:

the generating of the block is started based on establishment of start conditions;

a rule for selecting the storage destination serving as the storage destination from among the two or more of the storage destination differs according to the start condition.

7. The history management method according to claim 1, wherein:

each individual block contains identification information indicating the self-vehicle which generated the block.

8. The history management method according to claim 1, wherein:

a self-vehicle block provided as the block is stored in a block storage unit of the self-vehicle together with other-vehicle blocks acquired from other vehicles, the other vehicles comprising vehicles other than the self-vehicle.

9. The history management method according to claim 8, wherein:

the block storage unit has a set upper limit of the number of other vehicles of which the other-vehicle blocks are storable in the block storage unit.

10. The history management method according to claim 8, wherein:

per other vehicle, the block storage unit has a set upper limit of the number of other-vehicle blocks storable in the block storage unit.

11. A history management apparatus that manages history information of a self-vehicle using a blockchain, for the self-vehicle, the blockchain being defined as a plurality of blocks each generated from the history information collected in the self-vehicle and connected in a chain in a chronological order such that a hash value generated based on previous block is included in next block, comprising:

at least one processor;

a computer readable medium storing machine-readable instructions that when executed by the processor cause the processor to:

generate a connection target block which is the block that, upon approved, is permitted to be connected to the blockchain, from the history information collected in the self-vehicle;

upon the connection target block being permitted to be connected to the blockchain, per the connection target block having been permitted to be connected to the blockchain, setting two or more storage destinations of a backup of the connection target block having been permitted to be connected to the blockchain, from among backup destination options including a different vehicle other than the self-vehicle, the backup of the connection target block comprising a copy of the connection target block that is sent to the two or more storage destinations;

connecting the connection target block to the blockchain; and sending the backup of the connection target block having been permitted to be connected to the blockchain to the storage destinations, wherein the two or more storage destinations are part of the backup destination options, and wherein setting the two or more storage destinations and sending the backup of the connection target block include:

determining whether the different vehicle exists in a range of vehicle-to-vehicle communications by the self-vehicle; and based on determining whether the different vehicle exists in the range of vehicle-to-vehicle communications by the self-vehicle, (i) setting the two or more storage destinations to include the different vehicle and sending the backup of the connection target block to the different vehicle by the vehicle-to-vehicle communications, or (ii) setting the two or more storage destination to two or more of the storage destination options outside the range of the vehicle-to-vehicle communications and sending the backup of the connection target block to the two or more storage destinations via communication cloud based on determining whether the different vehicle exists in a range of vehicle-to-vehicle communications by the self-vehicle.

* * * * *